(12) United States Patent
Schroeder et al.

(10) Patent No.: US 11,560,222 B2
(45) Date of Patent: Jan. 24, 2023

(54) BONDED SKINS FOR DUCTED-ROTOR AIRCRAFT

(71) Applicant: Bell Textron Inc., Fort Worth, TX (US)

(72) Inventors: Karl Schroeder, Southlake, TX (US); Timothy Brian Carr, Fort Worth, TX (US); David G. Carlson, North Richland Hills, TX (US); Kevin Stump, Arlington, TX (US); William Anthony Amante, Grapevine, TX (US); Joseph Richard Carpenter, Jr., Kennedale, TX (US)

(73) Assignee: Textron Innovations Inc., Providence, RI (US)

( * ) Notice: Subject to any disclaimer, the term of this patent is extended or adjusted under 35 U.S.C. 154(b) by 410 days.

(21) Appl. No.: 16/679,018

(22) Filed: Nov. 8, 2019

(65) Prior Publication Data
US 2021/0139139 A1  May 13, 2021

(51) Int. Cl.
| | |
|---|---|
| *B64C 27/32* | (2006.01) |
| *B64C 27/46* | (2006.01) |
| *B64F 5/10* | (2017.01) |
| *B64C 11/00* | (2006.01) |
| *B29C 65/48* | (2006.01) |
| *B29C 65/00* | (2006.01) |

(52) U.S. Cl.
CPC ............ *B64C 27/32* (2013.01); *B64C 11/001* (2013.01); *B64C 27/463* (2013.01); *B64F 5/10* (2017.01); *B29C 65/48* (2013.01); *B29C 66/7212* (2013.01)

(58) Field of Classification Search
CPC ..... B64C 11/001; B64C 27/32; B64C 27/463; B64C 27/48; B64F 5/10; B29C 65/48; B29C 66/1122; B29C 66/12221; B29C 66/346; B29C 66/3462; B29C 66/3464
See application file for complete search history.

(56) References Cited

U.S. PATENT DOCUMENTS

| | | | | |
|---|---|---|---|---|
| 7,255,528 | B2 * | 8/2007 | Stretton | F04D 29/644 |
| | | | | 415/196 |
| 2011/0232833 | A1 * | 9/2011 | Collins | F01D 11/127 |
| | | | | 156/165 |
| 2012/0043009 | A1 * | 2/2012 | Niermann | B05C 11/1021 |
| | | | | 156/356 |
| 2012/0211144 | A1 * | 8/2012 | Litzenberger | B29C 66/91411 |
| | | | | 156/379.6 |
| 2020/0164962 | A1 * | 5/2020 | Rowe | B32B 27/18 |

* cited by examiner

*Primary Examiner* — Joshua J Michener
*Assistant Examiner* — Ka Chun Leung
(74) *Attorney, Agent, or Firm* — Lightfoot & Alford PLLC

(57) ABSTRACT

A duct for a ducted-rotor aircraft may include an internal structure and an aerodynamic exterior skin that is adhesively bonded to the internal structure. The skin may include a leading-edge portion disposed at an inlet of the duct and an inner portion disposed along an interior of the duct. The inner portion of the skin may be bonded to the internal structure with a first bondline of adhesive and the leading-edge portion of the skin may be bonded to the inner portion of the skin with a second bondline of adhesive. One or both of the first and second bondlines of adhesive may be of non-uniform thickness to take up tolerance stackups between the inner portion of the skin, the leading-edge portion of the skin, and the internal structure.

11 Claims, 9 Drawing Sheets

BONDED SKINS FOR DUCTED-ROTOR AIRCRAFT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Ducted-rotor aircraft have at least one ducted rotor for providing lift and propulsion forces. Each ducted rotor has aerodynamic ductwork, such as a cowling or fairing, that shapes and/or modifies characteristics of inlet air that passes by the blades of the rotor. Such ductwork typically includes an aerodynamic exterior skin and internal structure, such as annular spars, that support the exterior skin. A tip gap exists between tips of the blades and the exterior skin. Maintaining tight tip-gap tolerances is desirable because as tip gap narrows, performance characteristics of the rotor, such as thrust, improve.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Adhesively bonded aerodynamic skins and adhesive bondline variation are disclosed herein for use in aircraft such as ducted-rotor aircraft, for example.

Figure 1:
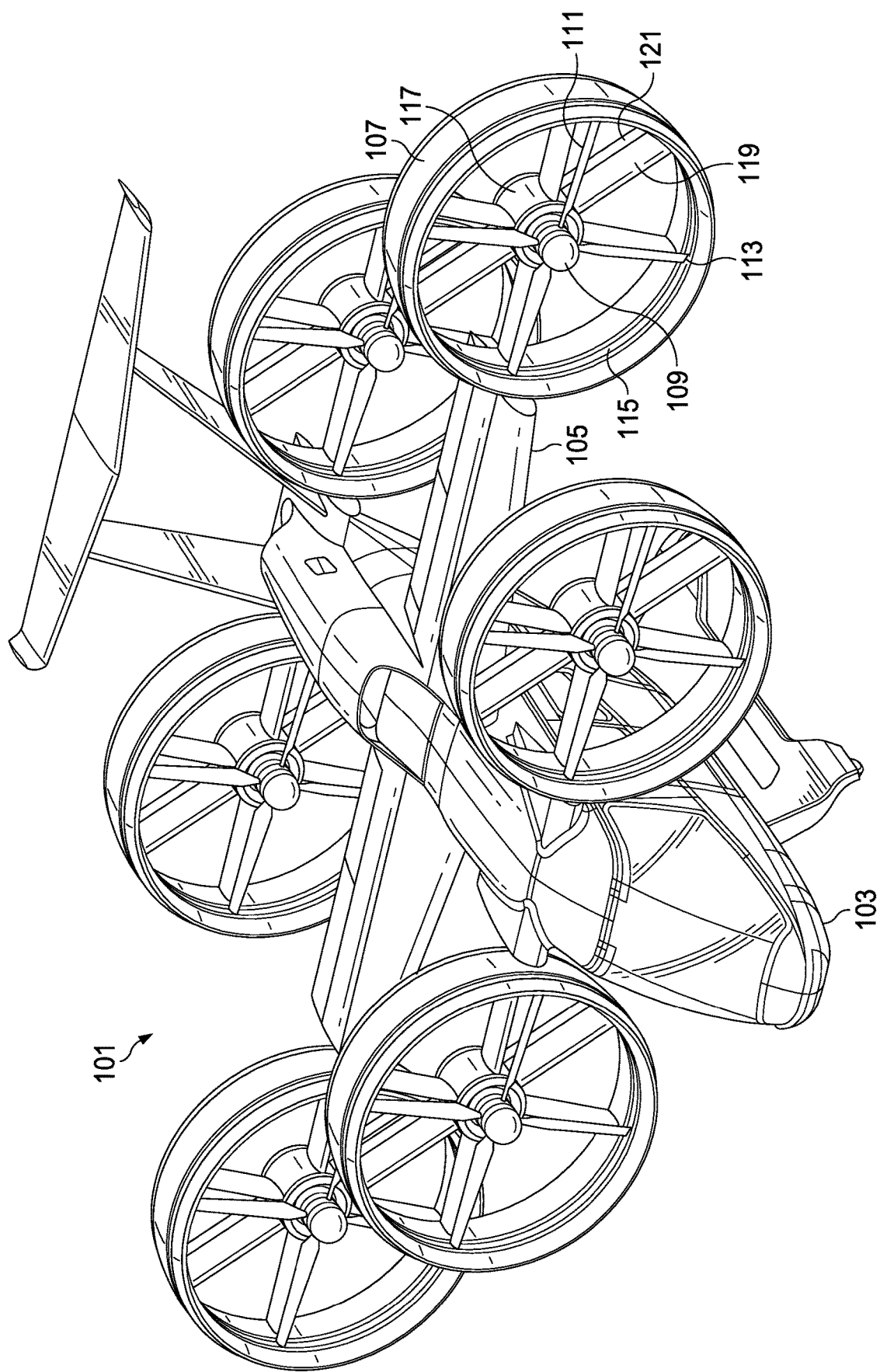
FIG. 1 is an oblique view of an aircraft with ducted rotors.

FIG. 1 is an oblique view of a ducted-rotor aircraft 101. Aircraft 101 comprises a fuselage 103 with a plurality of fixed wings 105 extending therefrom and a plurality of pivotable ducts 107. As shown, a duct 107 is located at an end of each wing 105. Each duct 107 houses a power plant for driving an attached rotor 109 in rotation. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in airplane mode, which allows for high-speed forward-flight. Ducts 107 are repositionable to convert aircraft 101 into helicopter mode (not shown), which allows for vertical takeoff and landing, hovering, and low-speed directional movement. Each blade 111 defines a tip 113 that is spaced from an inner surface 115 of a corresponding duct 107 through a distance that may be referred to as a tip gap.

Each duct 107 includes a central hub 117 that is configured to receive a rotor 109 and/or other components. Each duct 107 further includes a plurality of stators 119 that extend outwardly from the hub 117. Each duct 107 includes six stators 119 that extend radially outward from hub 117. As shown, stators 119 are unequally spaced about hub 117. It should be appreciated that duct 107 may be alternatively configured with more or fewer stators 119. It should further be appreciated that duct 107 may be alternatively configured with different spacing of stators 119 about hub 117. Duct 107 further includes vanes 121 that are pivotally attached to respective stators 119, such that vanes 121 may be rotated to facilitate changes of direction, turning, etc. during flight of aircraft 101.

Figure 2:
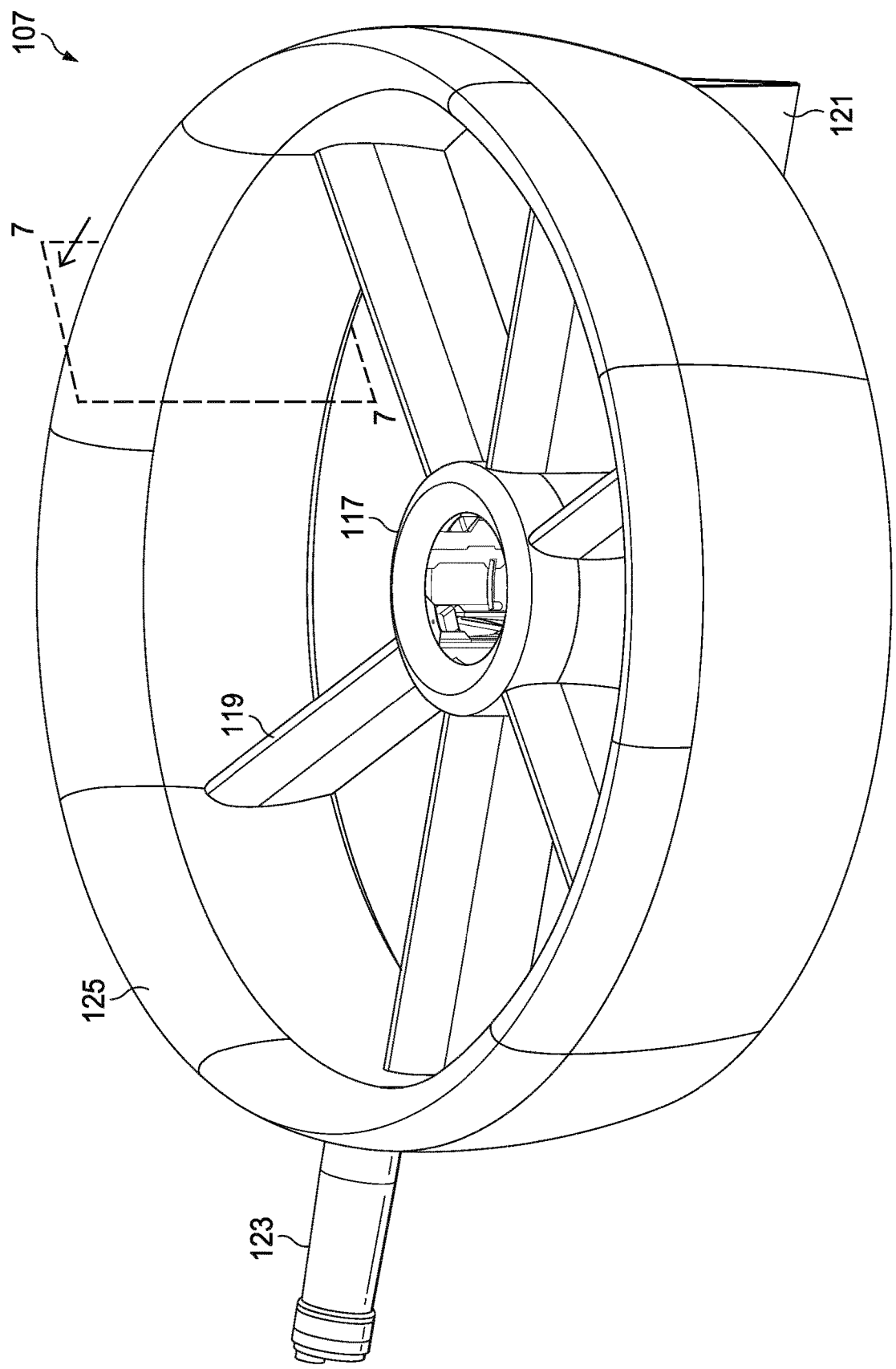
FIG. 2 is an oblique view of a duct of the aircraft depicted in FIG. 1.

FIG. 2 is an oblique view of a duct 107 of aircraft 101. Duct 107 is depicted in FIG. 2 without rotor 109. As shown, duct 107 includes a spindle 123 that extends outward and that facilitates pivotable attachment of duct 107 to a corresponding wing 105 of aircraft 101. Duct 107 may include one or more sections of fairing 125 that form an aerodynamic exterior skin of duct 107. As shown, a corresponding portion of fairing 125 defines inner surface 115 of duct 107 such that tips 113 of blades 111 of rotor 109 are spaced from inner surface 115 during rotation of blades 111 by a predetermined tip gap.

Figure 3:
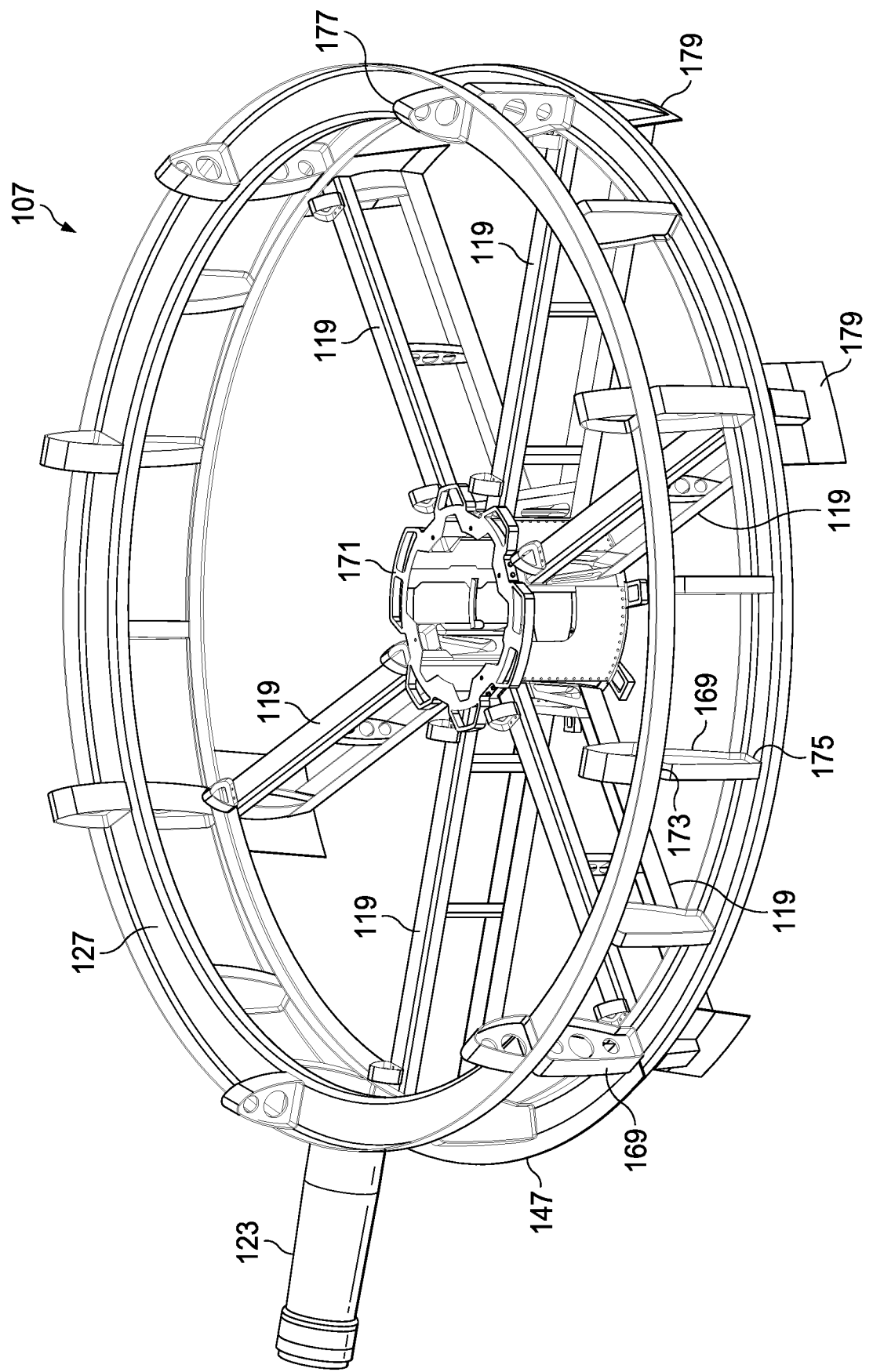
FIG. 3 is an oblique view of the duct depicted in FIG. 2, with an exterior skin of the duct removed to illustrate internal components of the duct.

FIG. 3 is an oblique view of duct 107 with fairing 125 removed to illustrate inner components of duct 107. Included among structural members of duct 107 are stators 119, spindle 123, an annular forward spar 127, an annular aft spar 147, a plurality of ribs 169, and an inner hub assembly 171. Hub assembly 171 is configured to facilitate attachment of and support a motor (not shown) of rotor 109 and is further configured to facilitate attachment of respective ends of stators 119 to hub 117.

Each rib 169 defines an upper end 173 and an opposed lower end 175. The upper end 173 of each rib 169 is configured to attach to forward spar 127, and the lower end 175 of each rib 169 is configured to attach to aft spar 147, such that forward spar 127 is spaced from aft spar 147. Ribs 169, when attached in place, extend between forward spar 127 and aft spar 147. As shown, ribs 169 may be configured with differing geometries. For example, respective ribs 169 positioned above the ends of stators 119 may be wider than the remaining ribs 169 and may define one or more apertures that extend therethrough. It should be appreciated that duct 107 is not limited to the illustrated configuration of ribs 169. For example, duct 107 may be implemented with more or fewer ribs and/or with ribs having the same or different geometries as compared to ribs 169. In this embodiment, each of the plurality of ribs 169 defines a curved outward-facing surface that is configured to facilitate attachment of a corresponding portion of fairing 125 to duct 107.

In this embodiment, the structural members of duct 107 further include braces 177 and stator brackets 179. Braces 177 are attached to forward spar 127 and are configured to support corresponding portions of fairing 125. As shown, braces 177 are spaced apart around forward spar 127, attached to forward spar 127 at locations above every other rib 169. Stator brackets 179 are attached to aft spar 147 at locations where stators 119 intersect aft spar 147. Stator brackets 179 are configured to facilitate attachment of respective ends of stators 119 to aft spar 147. As shown, stator brackets 179 may be configured with differing geometries. In this embodiment, each stator bracket 179 is fabricated as a single-piece component.

One or both of forward spar 127 and aft spar 147 may be constructed of composite material. In this disclosure, composite material preferably refers to plies of a fiber-reinforced plastic (FRP) composition that includes filament fibers, such as carbon fibers for example, embedded in a thermoset polymer matrix material such as a thermoplastic resin. Preferably the fibers within the plies are woven and the plies are pre-impregnated with resin. To illustrate, forward spar 127 and aft spar 147 may be constructed from one or more layered plies of carbon-fiber-reinforced plastic (CFRP). It should be appreciated that duct 107 is not limited to an implementation having two spars such as forward spar 127 and aft spar 147. For example, duct 107 may be alternatively implemented with more or fewer spars.

When ducts 107 are positioned as shown in FIG. 1 with the blades 111 of rotors 109 rotating, air will move into ducts 107 past forward spar 127 as rotors 109 generate thrust that causes aircraft 101 to move in a forward direction. As air moves through ducts 107 while the blades 111 of rotors 109 are rotating, the air will move past aft spar 147 and be exhausted away from ducts 107, for example in an aft direction as aircraft 101 moves in a forward direction.

Figure 4:
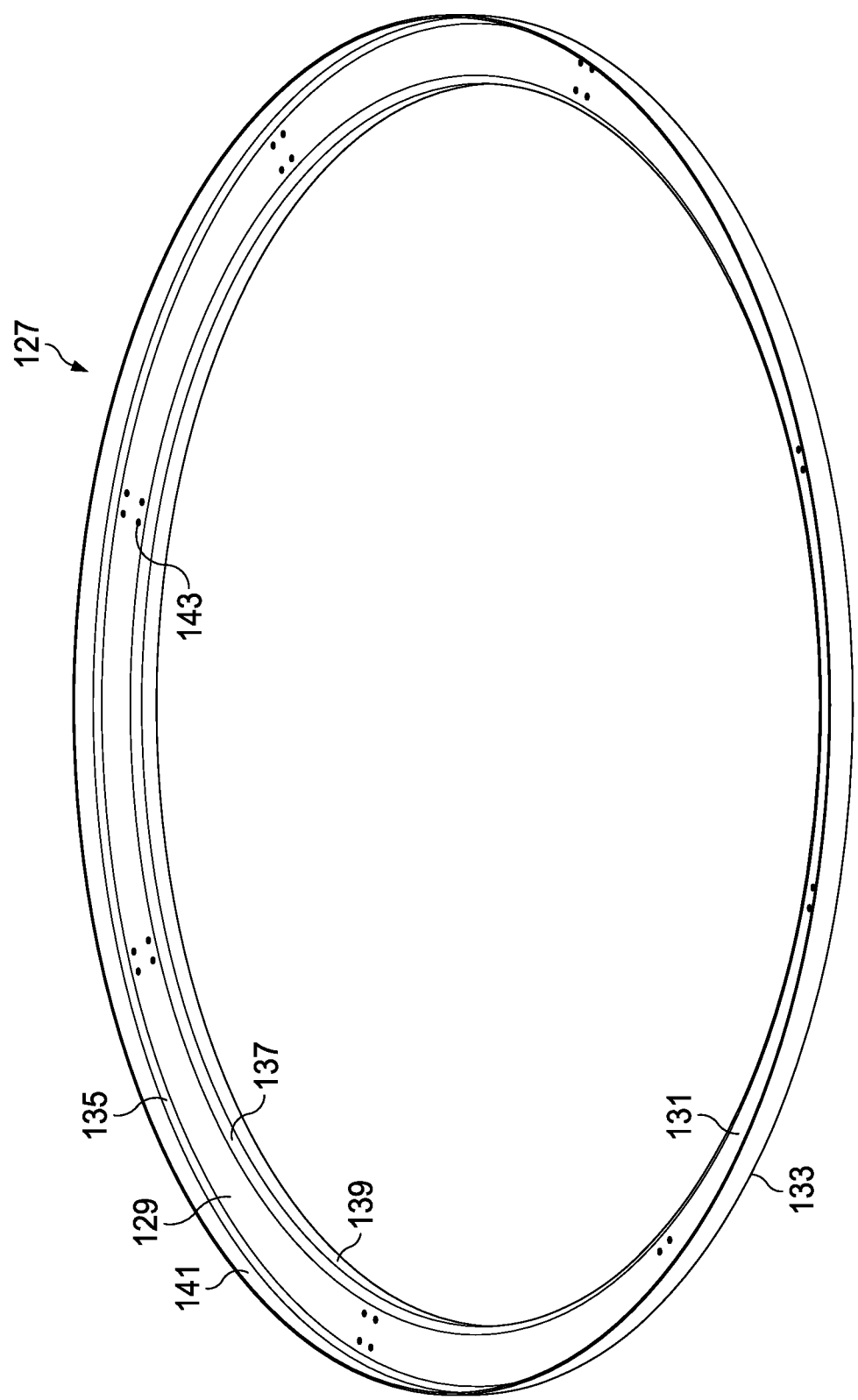
FIG. 4 is an oblique view of a forward spar component of the duct depicted in FIG. 3.

FIG. 4 is an oblique view of forward spar 127. In this embodiment, forward spar 127 includes an annular plate 129 that defines an upper surface 131 and an opposed lower surface 133. Plate 129 further defines a circumferential outer edge 135 and a circumferential inner edge 137. Forward spar 127 further includes a first circumferential flange 139 that extends away from lower surface 133 along inner edge 137 of plate 129. As shown, first circumferential flange 139 may be configured such that it tapers inwardly from inner edge 137, toward outer edge 135. Forward spar 127 further includes a second circumferential flange 141 that extends away from upper surface 131 along outer edge 135 of plate 129. As shown, second circumferential flange 141 may be configured such that it tapers inwardly from outer edge 135, toward inner edge 137. Forward spar 127 may be configured to facilitate attachment of one or more other components thereto, such as ribs 169 and braces 177. For example, as shown forward spar 127 defines a plurality of apertures 143 that extend through plate 129. Apertures 143 are configured to receive fasteners to secure ribs 169 and braces 177 to forward spar 127.

One or both of first circumferential flange 139 and second circumferential flange 141 may be configured to facilitate adhesive bonding of corresponding portions of fairing 125 thereto. In this embodiment, first circumferential flange 139 defines a first circumferential bonding surface to which one or more portions of fairing 125 can be adhesively bonded and second circumferential flange 141 defines a second circumferential bonding surface to which one or more portions of fairing 125 can be adhesively bonded. It should be appreciated that forward spar 127 is not limited to the bonding surface configuration of the illustrated embodiment. For example, forward spar 127 may be alternatively configured to define other suitable bonding surface geometries such as a substantially circumferential (e.g., discontinuous at one or more locations) bonding surface to which one or more portions of fairing 125 can be adhesively bonded. It should further be appreciated that forward spar 127 is not limited to a single-piece construction as illustrated and described herein. For example, forward spar 127 may be alternatively constructed of two or more pieces that are couplable to one another.

Figure 5:
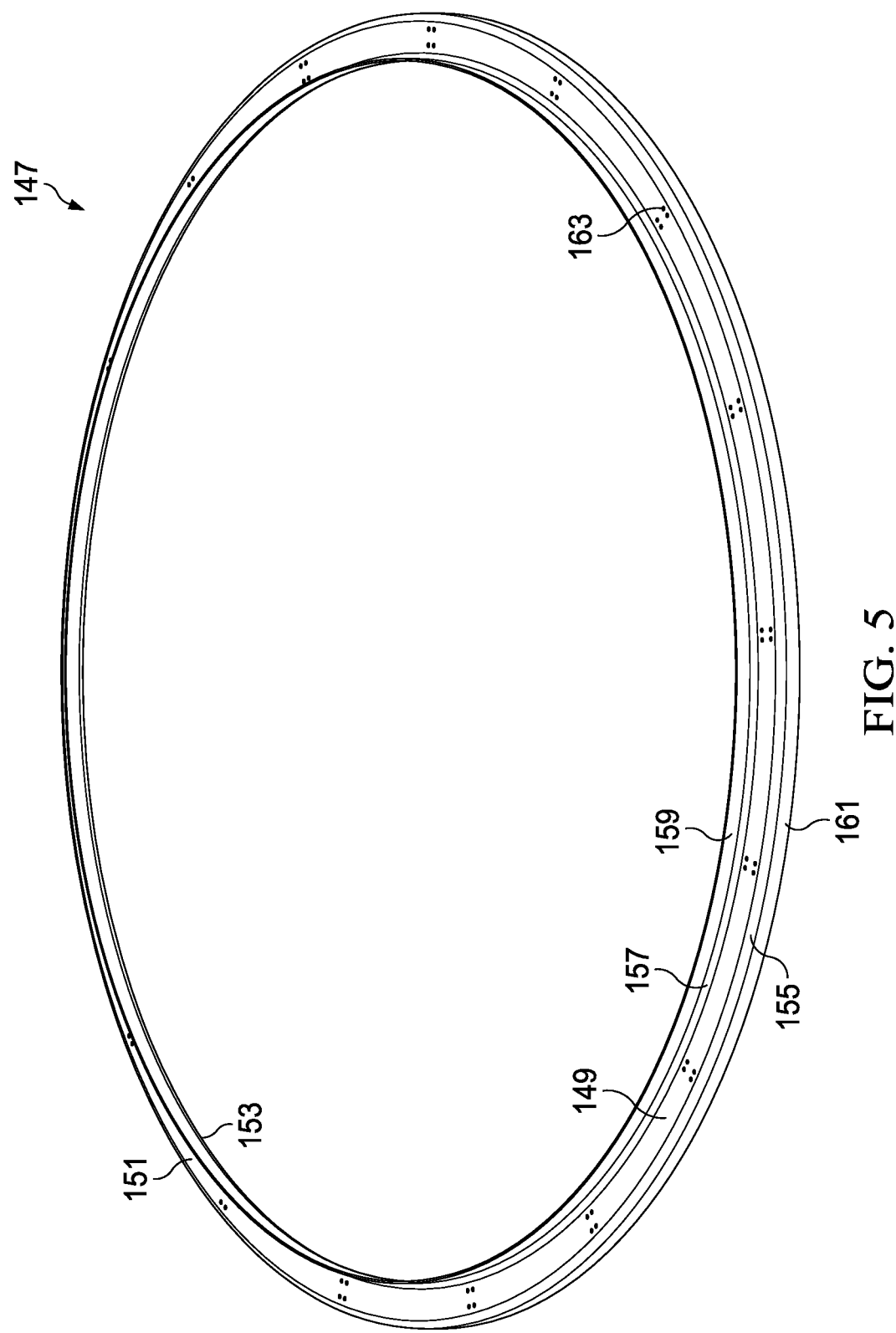
FIG. 5 is an oblique view of an aft spar component of the duct depicted in FIG. 3.

FIG. 5 is an oblique view of aft spar 147. In this embodiment, aft spar 147 includes an annular plate 149 that defines an upper surface 151 and an opposed lower surface 153. Plate 149 further defines a circumferential outer edge 155 and a circumferential inner edge 157. Aft spar 147 includes a first circumferential flange 159 that extends away from upper surface 151 along inner edge 157 of plate 149. As shown, first circumferential flange 159 may be configured such that it tapers outwardly from inner edge 157, away from outer edge 155. Aft spar 147 further includes a second circumferential flange 161 that extends away from lower surface 153 along outer edge 155 of plate 149. As shown, second circumferential flange 161 may be configured such that it tapers inwardly from outer edge 155, toward inner edge 157. Aft spar 147 may be configured to facilitate attachment of one or more other components thereto, such as stator brackets 179. For example, as shown aft spar 147 defines a plurality of apertures 163 that extend through plate 149. Apertures 163 may be configured, for example, to receive fasteners to secure stator brackets 179 to aft spar 147.

One or both of first circumferential flange 159 and second circumferential flange 161 may be configured to facilitate adhesive bonding of corresponding portions of fairing 125 thereto. In this embodiment, first circumferential flange 159 defines a first circumferential bonding surface to which one or more portions of fairing 125 can be adhesively bonded and second circumferential flange 161 defines a second circumferential bonding surface to which one or more portions of fairing 125 can be adhesively bonded. It should be appreciated that aft spar 147 is not limited to the bonding surface configuration of the illustrated embodiment. For example, aft spar 147 may be alternatively configured to define other suitable bonding surface geometries such as a substantially circumferential (e.g., discontinuous at one or more locations) bonding surface to which one or more portions of fairing 125 can be adhesively bonded. It should further be appreciated that aft spar 147 is not limited to a single-piece construction as illustrated and described herein. For example, aft spar 147 may be alternatively constructed of two or more pieces that are couplable to one another.

Figure 6:
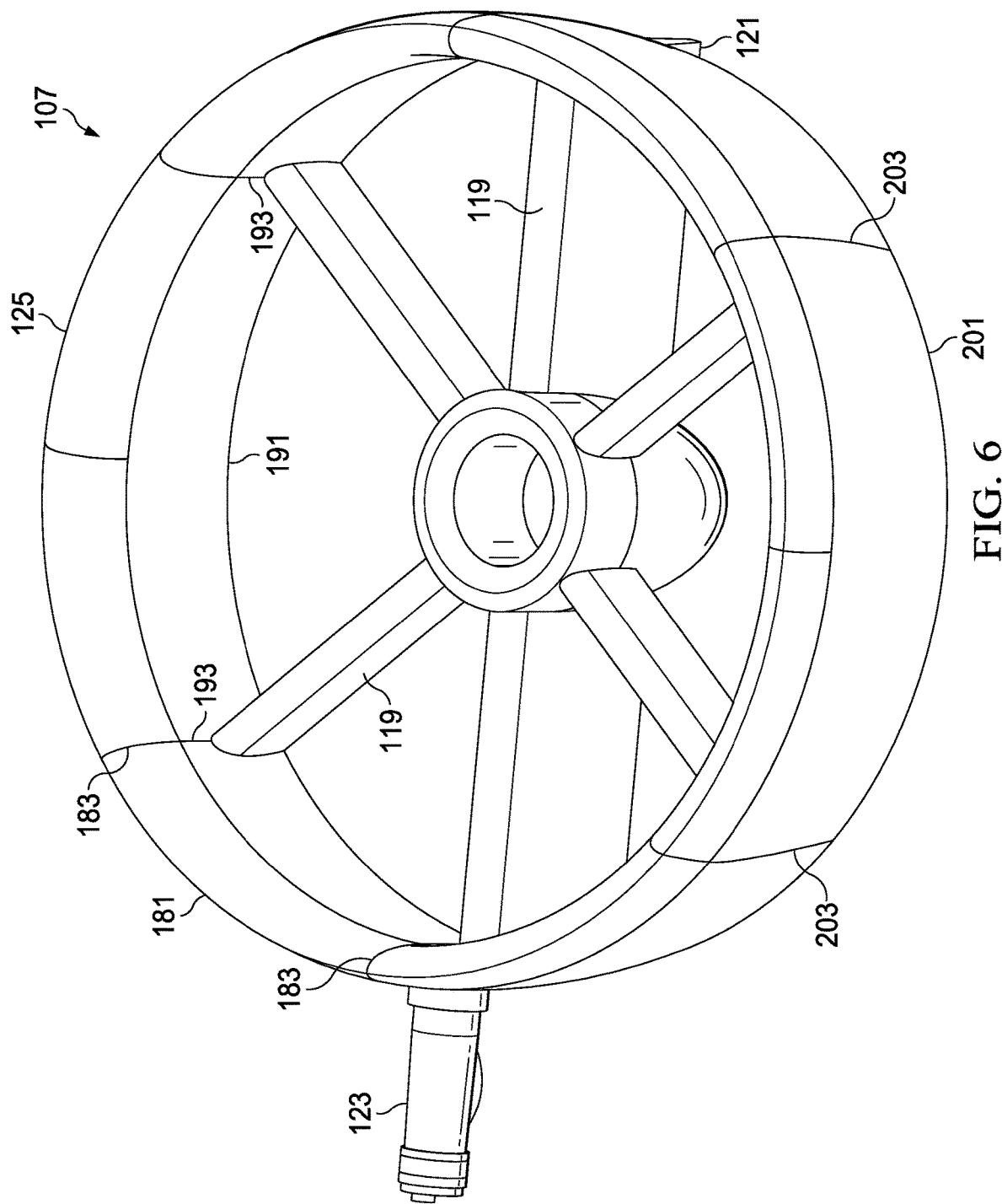
FIG. 6 is an oblique view of the duct depicted in FIG. 2, illustrating components of the exterior skin of the duct.

FIG. 6 is an oblique view of duct 107, illustrating fairing 125, which comprises an aerodynamic exterior skin that is attached to structural components of duct 107. Fairing 125 may include one or more leading-edge portions 181 that at least partially define an inlet for air entering duct 107. In this regard, it can be said that leading-edge portions 181 of fairing 125 are disposed at the inlet of duct 107. In this embodiment, fairing 125 includes eight leading-edge portions 181 disposed circumferentially about the inlet of duct 107. Each leading-edge portion 181 defines opposed edges 183, with each edge 183 abutting a corresponding edge 183 of an adjacent leading-edge portion 181 when fairing 125 is installed on duct 107. As shown, leading-edge portions 181 are configured with the same geometries.

Fairing 125 may further include one or more inner portions 191 that are disposed along an interior of duct 107, aft of leading-edge portions 181. In this embodiment, fairing 125 includes four inner portions 191 disposed circumferentially about the interior of duct 107. Each inner portion 191 defines opposed edges 193, with each edge 193 abutting a corresponding edge 193 of an adjacent inner portion 191 when fairing 125 is installed on duct 107. As shown, inner portions 191 may be configured with differing geometries. For example, two inner portions 191 may each define a first length from edge 193 to edge 193 that is longer than a second length from edge 193 to edge 193 of the remaining two inner portions 191. Furthermore, each inner portion 191 may be configured to partially surround portions of one or more stators 119. For example, each inner portion 191 of the first length may be configured to partially surround three stators 119, and each inner portion 191 of the second length may be configured to partially surround two stators 119.

Fairing 125 may further include one or more outer portions 201 that are disposed along an exterior of duct 107, aft of leading-edge portions 181. In this embodiment, fairing 125 includes four outer portions 201 disposed circumferentially about the exterior of duct 107. Each outer portion 201 defines opposed edges 203, with each edge 203 abutting a corresponding edge 203 of an adjacent outer portion 201 when fairing 125 is installed on duct 107. As shown, inner portions 191 may be configured with differing geometries. For example, two outer portions 201 may each define a first length from edge 203 to edge 203 that is longer than a second length from edge 203 to edge 203 of the remaining two outer portions 201.

Fairing 125, and more particularly leading-edge portions 181, inner portions 191, and outer portions 201 may be made of any appropriately stiff material, such as FRP, CFRP, aluminum, or the like. It should be appreciated that duct 107 is not limited to the illustrated configuration of fairing 125. For example, fairing 125 may be implemented with more or fewer leading-edge portions 181, more or fewer inner portions 191, and/or more or fewer outer portions 201. Additionally, the fairing of duct 107 may be implemented with alternatively configured portions that include one or more sections of leading-edge portions 181, inner portions 191, and/or outer portions 201.

Figure 7:
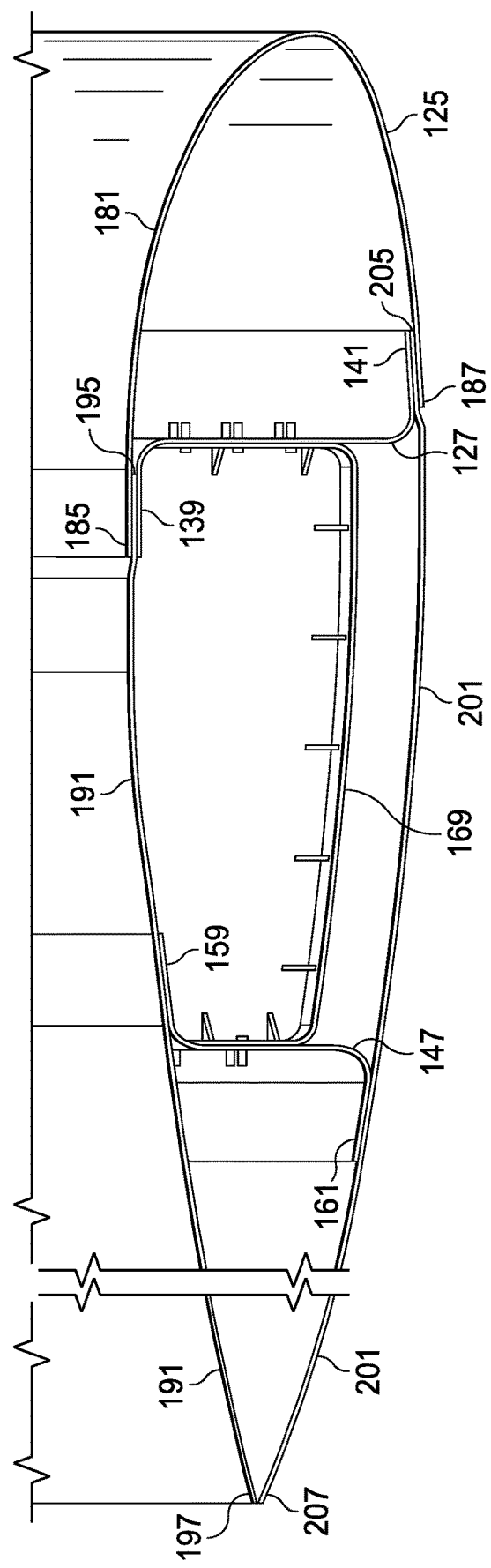
FIG. 7 is a cross-sectional view of a portion of the duct depicted in FIG. 2, illustrating the exterior skin attached to internal structure of the duct.

FIG. 7 is a cross-sectional view of a portion of duct 107, illustrating fairing 125 attached to internal structure of duct 107. Fairing 125 may be attached to duct 107 without the use of mechanical fasteners. In this embodiment, respective portions of fairing 125 are adhesively bonded to corresponding structural components of duct 107 using adhesive. Each inner portion 191 of fairing 125 defines a first end 195 and an opposed end 197. First end 195 of each inner portion 191 is adhesively bonded to a corresponding section of first circumferential flange 139 of forward spar 127. Each leading-edge portion 181 of fairing 125 defines a first end 185 and an opposed second end 187. First end 185 of each leading-edge portion 181 is adhesively bonded to a corresponding inner portion 191 near the first end 195 thereof. Because the first end 185 of each leading-edge portion 181 is adhesively bonded to a corresponding inner portion 191 proximal to first circumferential flange 139 of forward spar 127, both inner portions 191 and leading-edge portions 181 of fairing 125 are adhesively bonded, directly and indirectly respectively, to first circumferential flange 139 of forward spar 127. Furthermore, leading-edge portions 181 and inner portions 191 of fairing 125 are adhesively bonded to forward spar 127 such that first ends 195 of inner portions 191 of fairing 125 are captured between first ends 185 of leading-edge portions 181 and first circumferential flange 139 of forward spar 127.

Each outer portion 201 of fairing 125 defines a first end 205 and an opposed second end 207. First end 205 of each outer portion 201 is adhesively bonded to a corresponding section of second circumferential flange 141 of forward spar 127. Second end 187 of each leading-edge portion 181 is adhesively bonded to a corresponding outer portion 201 near the first end 205 thereof. Because the second end 187 of each leading-edge portion 181 is adhesively bonded to a corresponding outer portion 201 proximal to second circumferential flange 141 of forward spar 127, both outer portions 201 and leading-edge portions 181 of fairing 125 are adhesively bonded, directly and indirectly respectively, to second circumferential flange 141 of forward spar 127. Furthermore, leading-edge portions 181 and outer portions 201 of fairing 125 are adhesively bonded to forward spar 127 such that first ends 205 of outer portions 201 of fairing 125 are captured between second ends 187 of leading-edge portions 181 and second circumferential flange 141 of forward spar 127.

In this embodiment, corresponding portions of fairing 125 are further adhesively bonded to aft spar 147. In particular, inner portions 191 are adhesively bonded, at a location between first ends 195 and second ends 197, to first circumferential flange 159 of aft spar 147, and outer portions 201 are adhesively bonded, at a location between first ends 205 and second ends 207, to second circumferential flange 161 of aft spar 147. Inner portions 191 and outer portions 201 may be attached to one another at second ends 197, 207, respectively thereof. For instance, depending on circumferential location portions of second ends 197 and 207 may be adhesively bonded to a corresponding stator bracket 179, and/or may be bonded to each other. Additionally, leading-edge portions 181 may be adhesively bonded to braces 177 at corresponding locations. Furthermore, inner portions 191 and/or outer portions 201 may be adhesively bonded to ribs 169 at corresponding locations.

Figure 8:
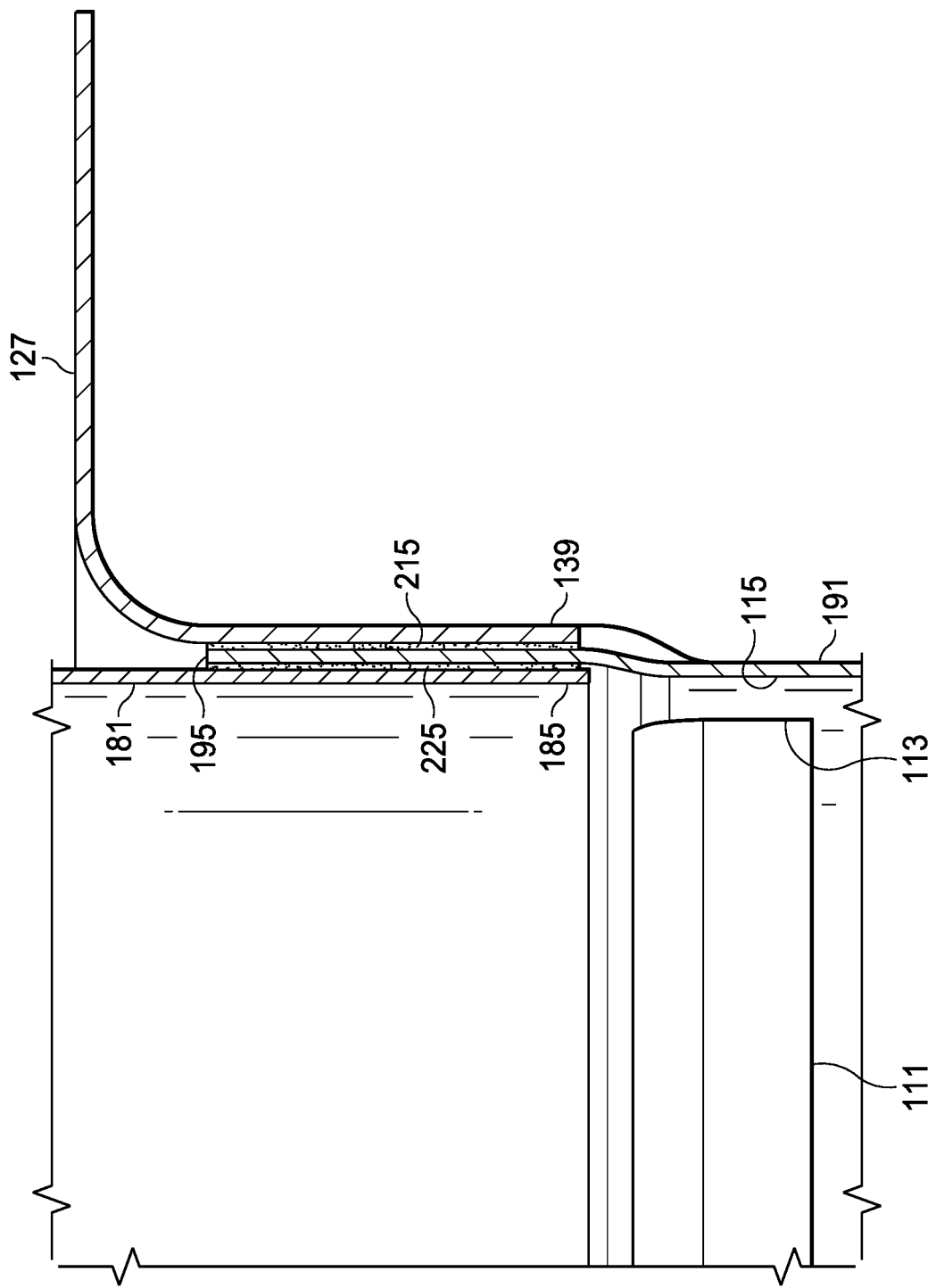
FIG. 8 is a magnified portion of the cross-sectional view depicted in FIG. 7.

FIG. 8 is a cross-sectional view of a portion of duct 107, illustrating leading-edge portions 181 and inner portions 191 of fairing 125 bonded to forward spar 127. In this embodiment, first ends 195 of inner portions 191 are adhesively bonded to first circumferential flange 139 of forward spar 127 with a first bondline 215 of adhesive, and first ends 185 of leading-edge portions 181 are adhesively bonded to the first ends 195 of corresponding inner portions 191 with a second bondline 225 of adhesive.

One or more of leading-edge portions 181 of fairing 125, inner portions 191 of fairing 125, and first circumferential flange 139 of forward spar 127 may exhibit one or more areas, such as localized areas, of varying cross-sectional thickness. Such variations in cross-sectional thickness, if unaccounted for, may introduce non-uniformities into the tip gap between tips 113 of blades 111 and inner surface 115 of duct 107, which may in turn cause degraded performance of aircraft 101. Accordingly, accounting for tolerance stackups caused by variations in cross-sectional thickness of components of duct 107 can improve and/or maintain tip-gap uniformity in duct 107. Maintaining uniformity of the tip gap can improve performance characteristics of ducts 107, which in turn improves the performance of aircraft 101.

One or both of first bondline 215 of adhesive and second bondline 225 of adhesive may be applied in respective varying thicknesses to account for, or take up, tolerance stackups caused by localized thickness variation of one or more of leading-edge portions 181 of fairing 125, inner portions 191 of fairing 125, and first circumferential flange 139 of forward spar 127. The thickness of first bondline 215 of adhesive may be varied in any combination of transverse (e.g., fore-to-aft) and/or lateral (e.g., circumferential) directions as necessary. Additionally or alternatively, second bondline 225 of adhesive may be varied in any combination of transverse and/or lateral directions. In this respect, first bondline 215 of adhesive may be applied having one or more areas of non-uniform thickness to take up respective tolerance stackups between inner portions 191 of fairing 125 and first circumferential flange 139 of forward spar 127. Additionally or alternatively, second bondline 225 of adhesive may be applied having one or more areas of non-uniform thickness to take up respective tolerance stackups between inner portions 191 of fairing 125 and leading-edge portions 181 of fairing 125.

Figure 9:
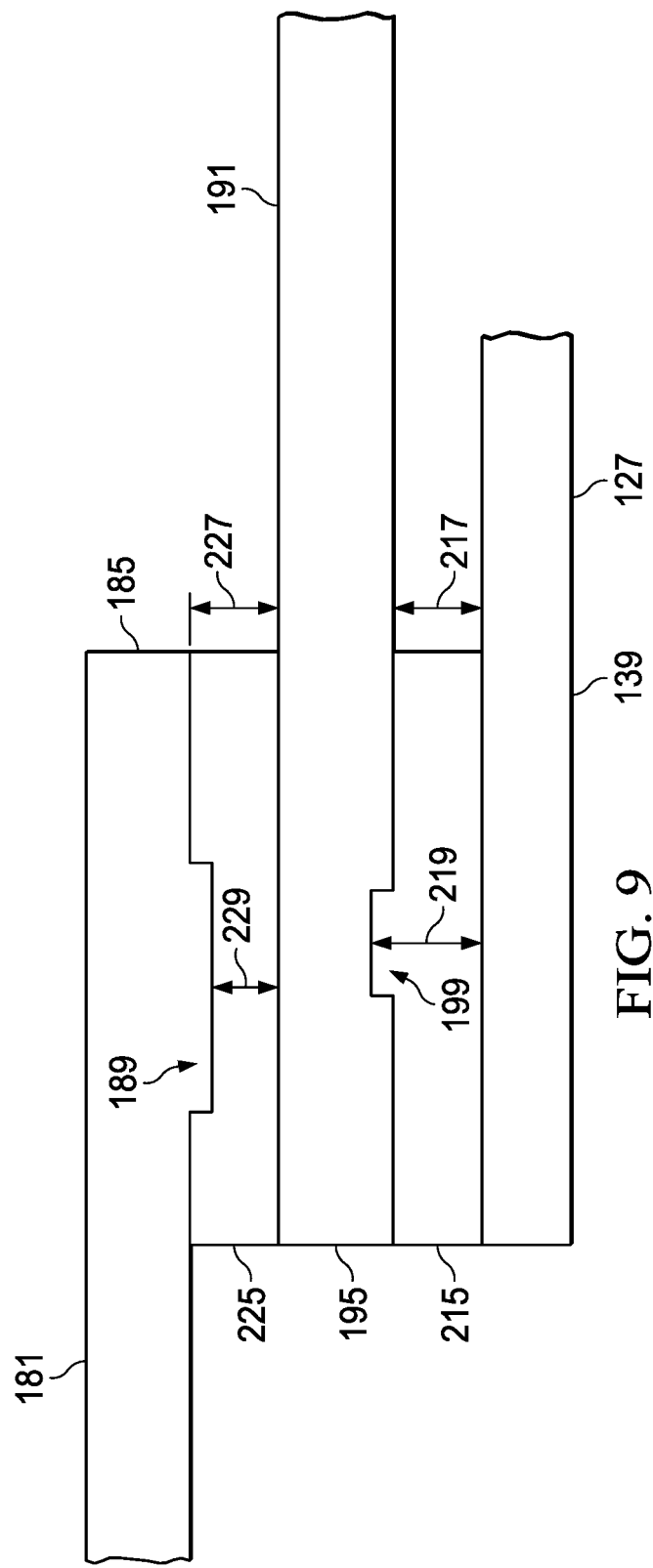
FIG. 9 is a schematic, magnified portion of the cross-sectional view depicted in FIG. 7 and illustrating an example of first and second bondlines of adhesive applied between portions of the exterior skin and internal structure of the duct depicted in FIG. 8, the first and second bondlines of adhesive having varying thicknesses.

FIG. 9 illustrates an example of varying the respective thicknesses of first bondline 215 of adhesive and second bondline 225 of adhesive to take up tolerance stackups caused by localized thickness variations of a leading-edge portion 181 of fairing 125 and an inner portion 191 of fairing 125. As shown, leading-edge portion 181 has a localized area 189 of increased thickness and inner portion 191 has a localized area 199 of decreased thickness. First bondline 215 of adhesive is applied between inner portion 191 of fairing 125 and first circumferential flange 139 of forward spar 127 in a first thickness 217 along areas where localized thickness variations are absent or minimal. To account for localized thinness at area 199 of inner portion 191, first bondline 215 of adhesive is applied at area 199 in a second thickness 219 that is thicker than first thickness 217. Second bondline 225 of adhesive is applied between inner portion 191 of fairing 125 and leading-edge portion 181 of fairing 125 in a first thickness 227 along areas where localized thickness variations are absent or minimal. To account for localized thickness buildup at area 189 of leading-edge portion 181, second bondline 225 of adhesive is applied at area 189 in a second thickness 229 that is thinner than first thickness 227.

In the embodiment shown in FIG. 9, an example method of attaching components of fairing 125 to duct 107 of ducted-rotor aircraft 101 comprises bonding first end 195 of inner portion 191 of fairing 125 to first circumferential flange 139 of forward spar 127 of duct 107 with first bondline 215 of adhesive. The example method further includes bonding first end 185 of leading-edge portion 181 of fairing 125 to first end 195 of inner portion 191 of fairing 125 with a second bondline 225 of adhesive. The example method may further comprise varying a thickness of first bondline 215 of adhesive to take up one or more tolerance stackups between inner portion 191 of fairing 125 and first circumferential flange 139 of forward spar 127. Alternatively, the example method may further comprise varying a thickness of second bondline 225 of adhesive to take up one or more tolerance stackups between inner portion 191 of fairing 125 and leading-edge portion 181 of fairing 125. Alternatively still, the example method may further comprise varying respective thicknesses of both first bondline 215 of adhesive and second bondline 225 of adhesive to take up tolerance stackups between the inner portion 191 of fairing 125, leading-edge portion 181 of fairing 125, and first circumferential flange 139 of forward spar 127.

It should be appreciated that FIG. 9 depicts a fictitious example of varying the respective thicknesses of first bondline 215 of adhesive and second bondline 225 of adhesive to account for localized thickness variations, and that in practice first bondline 215 of adhesive may be applied with one, more than one, or no variations in thickness, and second bondline 225 of adhesive may be applied with one, more than one, or no variations in thickness. Additionally, thickness variations in first bondline 215 of adhesive and second bondline 225 of adhesive need not be uniform as illustrated, and alternatively adhesive thickness may be stepped up and/or down within a single area of varied thickness. It should further be appreciated that varying adhesive bondline thickness is not limited to the illustrated application of bonding leading-edge portion 181 and inner portion 191 of fairing 125 to forward spar 127, and that varying adhesive bondline thickness may be implemented in bonding respective portions of fairing 125 to one or more other components of duct 107. It should be appreciated that varying adhesive bondline thickness is not limited to implementations of bonding fairing 125 to duct 107, and that varying adhesive bondline thickness may be implemented in bonding exterior aerodynamic skin to one or more other components of aircraft 101. Moreover, varying the thickness of one or more bondlines of adhesive is not limited to applications for aircraft 101, and may alternatively be implemented, for example, in bonding exterior skins to other types of aircraft and/or aircraft components such as wing or tail structures, or may be alternatively implemented in applications other than aircraft where bonding skins to structure while accounting for thickness variations is desirable.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A duct for a ducted-rotor aircraft, the duct comprising:
   a rotor having a plurality of blades, each of the plurality of blades having a tip;
   a structural member that defines a bonding surface; and
   an aerodynamic skin, comprising a leading-edge portion disposed at an inlet of the duct and an inner portion disposed along an interior of the duct;
   wherein a first end of the inner portion is bonded directly to the bonding surface with a first bondline of adhesive;
   wherein a first end of the leading-edge portion is bonded directly to the first end of the inner portion with a second bondline of adhesive; and
   wherein the tips of the plurality of blades are spaced from a corresponding portion of the aerodynamic skin by a tip gap.

2. The duct of claim 1, wherein the first bondline of adhesive is of variable thickness to maintain uniformity of the tip gap.

3. The duct of claim 1, wherein the second bondline of adhesive is of variable thickness to maintain uniformity of the tip gap.

4. The duct of claim 1, wherein both the first and second bondlines of adhesive are of variable thickness to maintain uniformity of the tip gap.

5. A duct for a ducted-rotor aircraft, the duct comprising:
   a rotor having a plurality of blades, each of the plurality of blades having a tip;
   a structural member that defines an inboard bonding surface; and
   an aerodynamic skin, comprising a leading-edge portion disposed at an inlet of the duct and an inner portion disposed along an interior of the duct;
   wherein a first end of the inner portion is bonded directly to the inboard bonding surface with a first inboard bondline of adhesive;
   wherein a first end of the leading-edge portion is bonded directly to the first end of the inner portion with a second inboard bondline of adhesive, the first end of the inner portion being located between the inboard bonding surface and the first end of the leading-edge portion; and
   wherein the tips of the plurality of blades are spaced from a corresponding portion of the aerodynamic skin by a tip gap.

6. The duct of claim 5, wherein the first bondline of adhesive is of variable thickness to maintain uniformity of the tip gap.

7. The duct of claim 5, wherein the second bondline of adhesive is of variable thickness to maintain uniformity of the tip gap.

8. The duct of claim 5, wherein both the first and second bondlines of adhesive are of variable thickness to maintain uniformity of the tip gap.

9. The duct of claim 5, wherein the inboard bonding surface is annular.

10. The duct of claim 5, further comprising:
    an outboard bonding surface coupled to the inboard bonding surface;
    an outer portion of the aerodynamic skin, the outer portion being disposed along an exterior of the duct;
    wherein a first end of the outer portion is bonded directly to the outboard bonding surface;
    wherein a second end of the leading-edge portion is bonded directly to the first end of the outer portion, the first end of the outer portion being located between the outboard bonding surface and the second end of the leading-edge portion.

11. The duct of claim 10, wherein the outboard bonding surface is annular.

* * * * *